United States Patent [19]

Pekari et al.

[11] 4,403,912
[45] Sep. 13, 1983

[54] INTEGRATED MULTIPLANE ACTUATOR SYSTEM FOR COMPRESSOR VARIABLE VANES AND AIR BLEED VALVE

[75] Inventors: Frederick J. Pekari, Trunbull; Robert E. Johnson, Stepney, both of Conn.

[73] Assignee: Avco Corporation, Stratford, Conn.

[21] Appl. No.: 246,657

[22] Filed: Mar. 23, 1981

[51] Int. Cl.³ .................. F01B 25/02; F01D 17/00
[52] U.S. Cl. .................... 415/150; 415/155; 415/160; 415/22; 74/471 R
[58] Field of Search ............... 415/145, 150, 160, 22, 415/28, 155; 137/630.19, 862, 869; 74/471 R

[56] References Cited

U.S. PATENT DOCUMENTS

| | | | |
|---|---|---|---|
| 1,256,759 | 2/1918 | Wilson | 137/630.19 X |
| 1,551,569 | 9/1925 | Johnson | 415/17 |
| 1,619,129 | 3/1927 | Johnson | 415/17 |
| 2,393,042 | 1/1946 | Hagen | 415/145 |
| 2,603,411 | 7/1952 | Trumpa | 415/150 |
| 2,616,663 | 11/1952 | North | 415/160 |
| 2,817,475 | 12/1957 | Moody | 415/150 X |
| 2,863,288 | 12/1958 | Martin | 415/145 |
| 2,879,799 | 3/1959 | Jansen et al. | 137/630.19 X |
| 3,055,445 | 9/1962 | Mendez et al. | 74/471 R X |
| 3,060,679 | 10/1962 | Schmitt | 60/224 |
| 3,172,259 | 3/1965 | North, Jr. | 60/39.27 |
| 3,276,461 | 10/1966 | Kerensky | 415/22 |
| 3,360,240 | 12/1967 | Williamson et al. | 415/16 |
| 3,779,665 | 12/1973 | Tatem, Jr. et al. | 415/150 X |
| 3,849,021 | 11/1974 | Eastman et al. | 415/30 |
| 3,873,230 | 3/1975 | Norris et al. | 415/162 |
| 3,973,391 | 8/1976 | Reed et al. | 60/30.29 |
| 4,171,113 | 10/1979 | Townsend | 74/471 R X |

FOREIGN PATENT DOCUMENTS 616417  3/1961  Canada ................ 415/160

*Primary Examiner*—Philip R. Coe
*Assistant Examiner*—Frankie L. Stinson
*Attorney, Agent, or Firm*—Ralph D. Gelling

[57] ABSTRACT

A linkage system for actuating the variable vanes and the air bleed valve of a gas turbine engine compressor in an intermittent sequence includes a single actuator and a linkage mechanism. The latter is formed of a first actuating linkage extending to the bleed control valve, a second actuation linkage extending to the variable guide vanes, and an intermediate crank mechanism connected to the first and second actuating linkages and also to the single actuator. The linkage system is operative to convert the linear motion from the single actuator to multiplane intermittent rotational motion of the actuating linkages extending to the variable vanes and the bleed valve of the compressor. When embodied in a military aircraft, the single actuator is preferably disposed above the compressor casing so as to make it less vulnerable to enemy ground fire.

1 Claim, 4 Drawing Figures

INTEGRATED MULTIPLANE ACTUATOR SYSTEM FOR COMPRESSOR VARIABLE VANES AND AIR BLEED VALVE

TECHNICAL FIELD

The subject invention relates to a unique actuation system for a gas turbine engine, and more particularly, an actuation system having a single actuator and a linkage mechanism connected to the gas turbine compressor and operative to convert linear motion from the single actuator to multiplane intermittent rotational motion of the actuating linkages extending to the variable vanes and the bleed valve of the compressor.

BACKGROUND OF THE INVENTION

It is often necessary to control the mass airflow through the compressor of a high performance axial flow gas turbine engine in order to avoid characteristic unstable operation of the compressor, particularly during engine acceleration. Fundamentally, such control may be exercised by either of two-conventional ways: by bleeding or venting compressor stages to a suitable relatively lower pressure drain source; or by varying the angle of the stator vanes to thereby vary the effective flow area of the compressor inlet to increase or decrease the mass airflow to the compressor. The latter control may be exercised by using one or more stages of the compressor stator which have a mounting angle relative to the direction of airflow within the engine that can be varied with changing conditions. The variable vane stators may also be used in conjunction with engine overboard air bleed as a means to avoiding unstable compressor operation during certain phases of an engine's operating regime. The control in the form of a bleed valve serves to facilitate engine starting and also serves to prevent compressor surge at low speed by ducting the compressor air overboard during low thrust operation. During high thrust operation, the bleed valve should be closed. When the bleed valve is open, it increases airflow to the upstream portion of the compressor and reduces the pressure on the bottleneck downstream.

In those applications where variable vane stators are used in conjunction with engine overboard air bleed valves, it has heretofore been known to provide two separate and distinct actuators for actuating the bleed valve and the variable geometry vanes with a suitable control system for coordinating the operation of the two actuators. As an example, reference is made to U.S. Pat. No. 3,172,259 of North, Jr. entitled "Variable Geometry Control for Gas Turbine Engines" which issued on Mar. 9, 1965 and is assigned to the assignee of the subject application. In U.S. Pat. No. 3,172,259 a plurality of servo pistons and a control system are employed for actuating one or more of the compressor interstage air bleeds, compressor discharge air bleeds, compressor variable stator blades, variable turbine exhaust nozzle areas, variable angle of the turbine stator blades, compressor inlet flow fences or restrictions, and turbine by-pass or bleed valves for improving engine performance under changing operating conditions.

Along the same lines are the disclosures in U.S. Pat. No. 3,973,391 to Reed et al, U.S. Pat. No. 2,616,663 to Alm, and U.S. Pat. No. 3,873,230 to Norris et al. The prior art systems which use individual actuators for each functional requirement have resulted in certain mounting problems of the actuators, excess fuel lines, complicated control connections, and vulnerability of the actuators to possible damage due to ground fire when the engine is employed in a combat aircraft. On the other hand, the employment of a single actuator for controlling the variable vane geometry as well as the bleed valve of a gas turbine compressor is complicated by the requirement for converting the linear motion from a single actuator to multiplane intermittent rotational motion by virtue of the different positions of the bleed valve and the variable vane actuating linkages about the periphery of the casing of the engine compressor. In addition, the use of a single actuator for negotiating the multiplane relationship of the bleed valve and the variable vanes could result in a linkage arrangement which has less than optimum design characteristics, and which could give rise to side loading on the linkage components thereof or accumulative tolerances or adjustments.

Accordingly, it is an object of the subject invention to provide a unique actuating system arranged such that a single actuator is operatively associated with the actuating linkage extending to the bleed valve and the actuating linkage extending to the variable vane actuating mechanism of a compressor of a gas turbine engine, and is operative to coordinate the intermittent operation of said bleed valve and the variable vanes during the entire operating regime of the compressor.

It is another object of the subject invention to provide an actuating system including a single actuator which is disposed in a position relative to the compressor casing so as to be less vulnerable to damage due to ground fire when employed in military aircraft.

Still another object of the subject invention is to provide a new and improved actuating system which is reliable, requires only a single actuator, and which provides multiplane intermittent rotational motion to the air bleed valve and the variable vane actuating linkages of a compressor.

A further object of the invention is to provide an actuator linkage arrangement which has optimum design characteristics with minimum side loading of the linkages.

SUMMARY OF THE INVENTION

In accordance with the above stated objects, the subject invention provides an integrated multiplane actuator mechanism interconnecting a single actuator with the bleed control valve and variable guide vanes of a compressor of a gas turbine engine. The actuator mechanism includes a first actuating linkage operatively extending between the bleed control valve and an intermediate crank means to which the single actuator is connected. A second actuating linkage extends between the variable guide vanes and the intermediate crank linkage. The bleed valve, the variable guide vanes and the actuator are disposed about the periphery of the casing of the compressor and, in operation, upon actuation of the actuator, the intermediate crank means causes the intermittent actuation of the bleed control valve and the variable guide vanes in a manner to obtain maximum efficiency at all operating modes of the engine. More particularly, during acceleration of the gas turbine engine, first the bleed control valve is actuated from an open condition to a closed position, after which, further actuation of the actuator results in displacement of the guide vanes for high performance operation of the gas turbine engine. Preferably, the single actuator is disposed above the compressor casing, thereby making it less vulnerable to ground fire when the mechanism is employed in a gas turbine engine of a military aircraft.

Further objects and advantages of the subject invention will become apparent from the following detailed description taken in conjunction with the drawings in which:

DESCRIPTION OF THE PREFERRED EMBODIMENT

Figure 1:
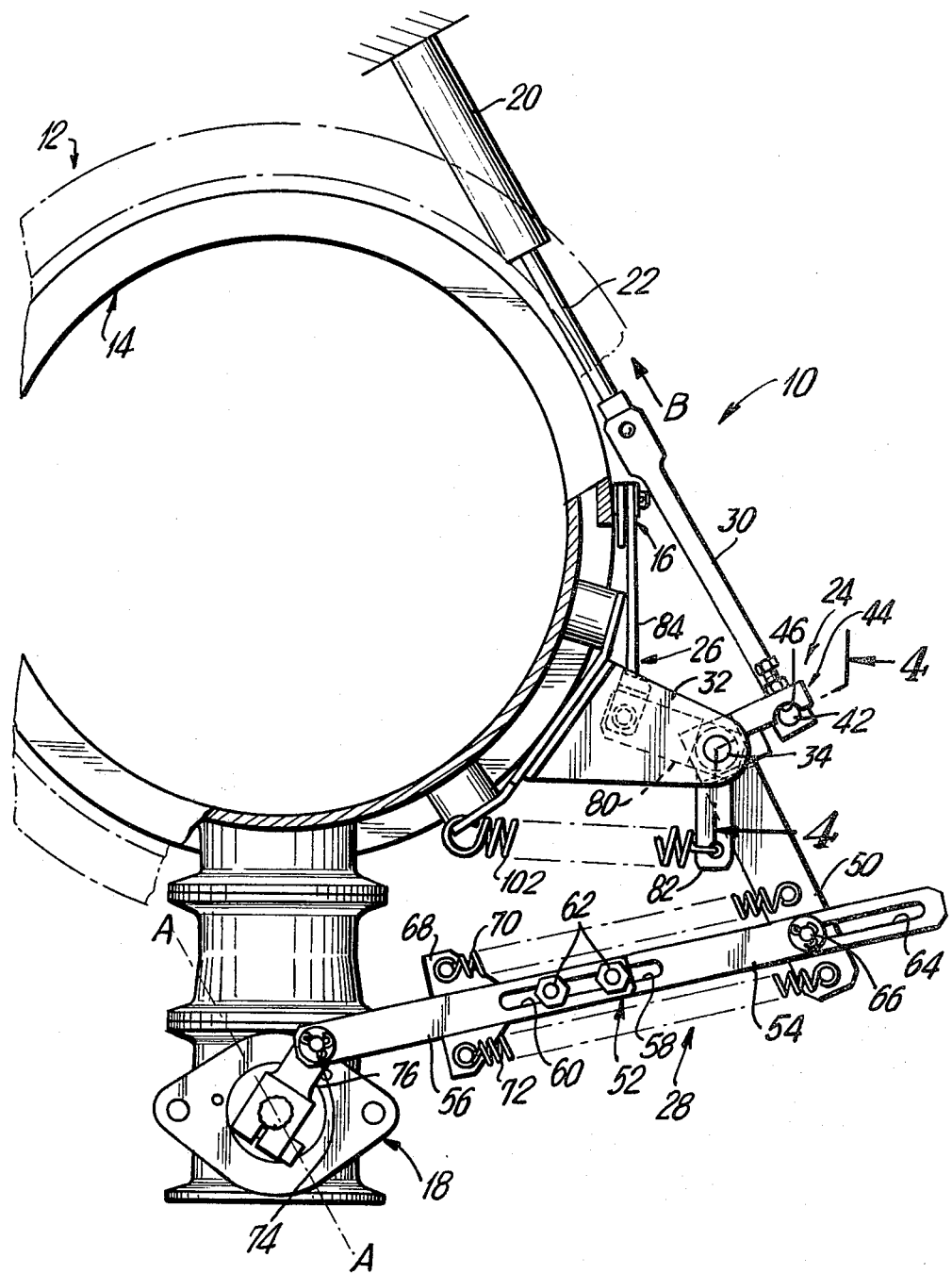
FIG. 1 is a front elevational view of the new and improved actuation system of the subject invention in which the bleed valve has been fully actuated without any actuation of the stator vanes.
Figure 2:
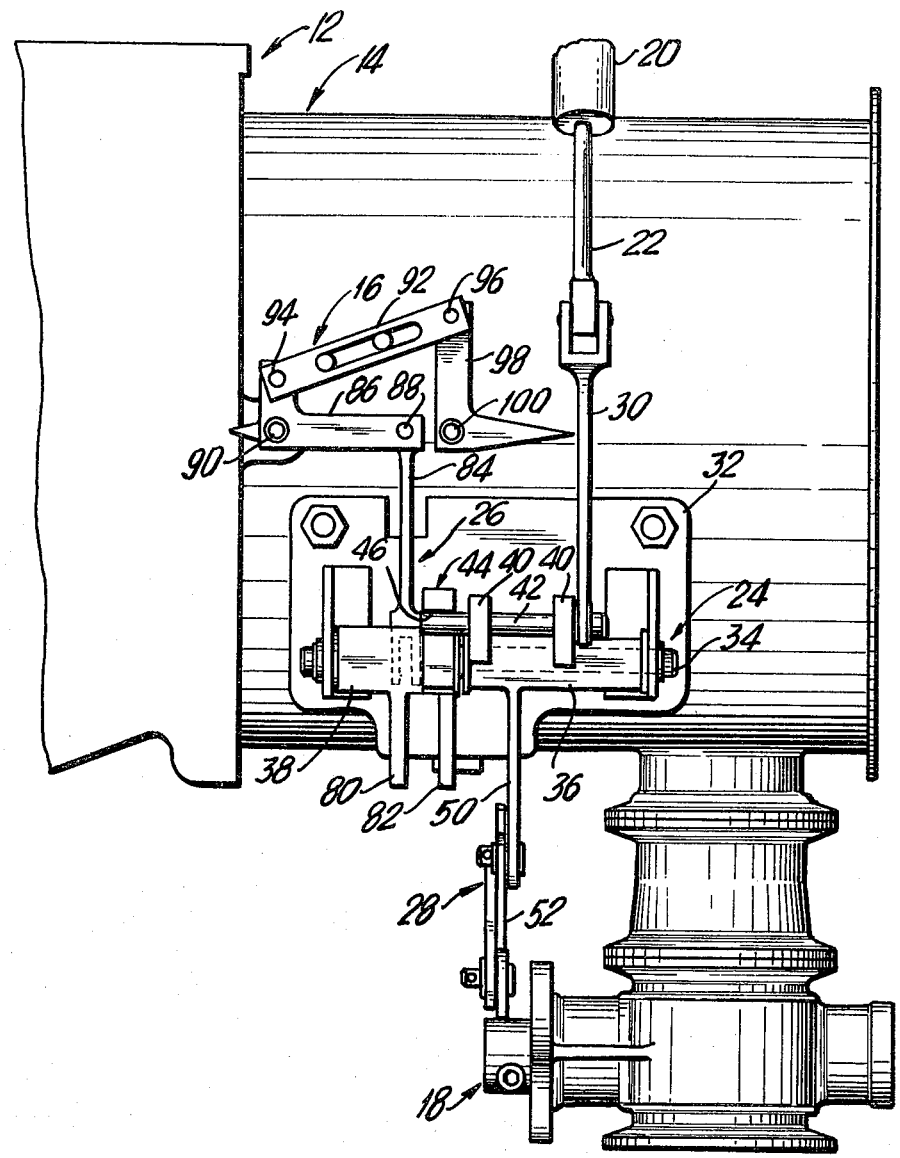
FIG. 2 is a side elevational view of the actuation system of the subject invention.

Referring to FIGS. 1 and 2, the integrated multiplane actuation system of the subject invention is generally designated by the numeral 10 and is embodied in a gas turbine engine 12 having a compressor section 14. The compressor 14 is of conventional design and includes a variable guide vane mechanism 16 and a bleed control valve mechanism 18. The integrated multiplane actuation system 10 is operative to intermittently control the operation of the variable guide vane mechanism 16 and the bleed control mechanism 18, and basically comprises a single actuator 20 having a piston rod 22, an intermediate crank mechanism 24, and first and second actuating linkages 28 and 26 respectively extending to the bleed control valve mechanism 18 and the guide vane mechanism 16. When embodied in military aircraft, the actuator 20 is disposed at the upper portion of the compressor, thereby rendering the actuator less susceptible to damage due to ground fire.

As noted above, in the operation of the compressor 14, during initial operation of the gas turbine engine, the bleed control valve is initially fully open and the guide vanes are at a specified attitude. As the gas turbine engine is accelerated, the bleed control valve is progressively actuated to the fully closed position, after which the guide vane mechanism is actuated such that the vanes are at an attitude to enable maximum operation of the compressor. In the compressor 14, the bleed control valve mechanism 18 is normally disposed at the lower portion of the compressor, in a generally diametrically opposite position about the circumference of the casing of the compressor 14 relative to the single actuator 20. On the other hand, the variable guide vane mechanism 16 is disposed at still a third portion about the circumference of the compressor casing 14, and accordingly, it is necessary that the subject invention enable the linear motion of the single actuator 20 to be converted in such a manner as to result in intermittent rotational forces for sequentially operating the bleed control valve mechanism 18 and then the variable guide vane mechanism 16.

Figure 4:
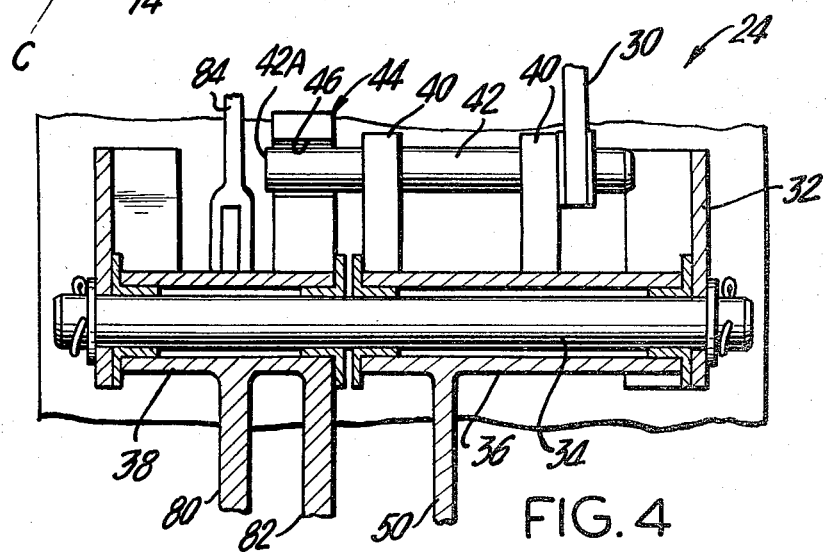
FIG. 4 is a detailed view, partially in section, of the intermediate crank assembly forming a portion of the actuating system of the subject invention.

According to the subject invention, as more particularly illustrated in FIGS. 2 and 4, the piston rod 22 of the single actuator 20 is connected by a link 30 to the intermediate crank mechanism 24. The latter includes a bracket assembly 32 for supporting a shaft 34 which extends generally parallel to and spaced from the cylindrical casing of the compressor 14. Journalled about the shaft 34 is a bleed valve crank cylinder 36 and a variable vane crank cylinder 38. Extending perpendicular to and forming a portion of the bleed valve crank cylinder 36 are a pair of spaced ears 40 which support a crank assembly pin 42 that is also disposed parallel to the longitudinal axis of the shaft 34. Extending perpendicular to the variable vane crank cylinder 38 is a projecting ear 44 having a recess 46 which corresponds to the cross-section of the crank assembly pin 42. As more particularly illustrated in FIG. 4, the left hand end 42A of the pin 42 extends beyond the end of the bleed valve crank cylinder 36 to a sufficient extent so as to be capable of engaging the recess 46 in the projecting ear 44, as more fully described hereinafter.

Figure 3:
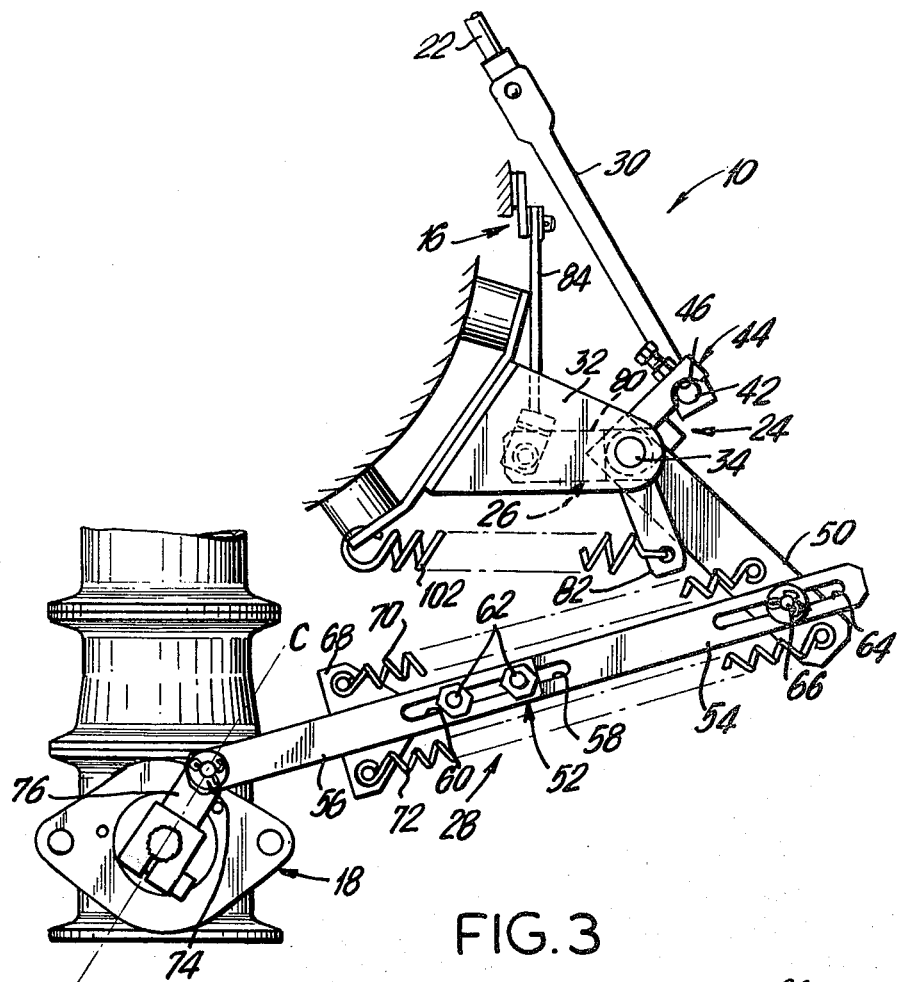
FIG. 3 is a view similar to FIG. 1, but illustrating the position of the actuating system of the invention in which both the bleed valve and stator vanes area actuated.

Referring to FIGS. 1, 3 and 4, extending from the bleed valve crank cylinder 36 is a crank arm 50 for interconnecting the intermediate crank mechanism 24, through the second actuating linkage 28, to the bleed control valve mechanism 18. More particularly, the second actuating linkage 28 includes an adjustable linkage 52 formed of links 54 and 56 which respectively include elongated slots 58 and 60. Links 54 and 56 are interconnected for adjustment along the longitudinal axis thereof by means of bolts 62 which extend through the aligned slots 58 and 60. Link 54 includes at the opposite end thereof, an elongated slot 64 which slidably receives a pin connection 66 for forming a connection between the link 54 and the crank arm 50.

A bracket 68 is fixedly secured to the link 56 intermediate the length thereof, and springs 70 and 72 are connected to and extend between the bracket 68 and the crank arm 50. By this arrangement, the springs 70 and 72 function to continually bias the crank arm 50 in such direction as to provide a clockwise biasing force on the bleed valve crank cylinder 36, as viewed in FIGS. 1 and 3. The opposite end of the link 56 is pivotally connected as at 74 to the crank arm 76 of the bleed control valve mechanism.

Referring to FIGS. 2, 3 and 4, extending from the variable vane crank cylinder 38 is a variable vane crank 80 and a spring crank 82. The variable vane crank 80 is operatively connected via link 84 to a first bellcrank 86 at pivotal connection 88. The first bellcrank 86 is pivotally connected as at 90 to the mechanism (not shown) within the compressor 14 for varying the attitude of the stator vanes. An adjustable linkage 92 is pivotally connected at one end by a pivot connection 94 to the first bellcrank 86, and at its opposite end at pivot connection 96, to a second bellcrank 98 which, in turn, is pivotally connected as at 100 and is operatively connected to the mechanism (not shown) for varying the attitude of the second stage stator vane assembly of compressor 14. Accordingly, upon rotative actuation of the variable vane crank cylinder 38, the linkage mechanism 84–100 causes actuation of the first and second stages of the stator vanes within the compressor 14.

As illustrated in FIGS. 1 and 3, the spring crank 82 is connected to the casing of the compressor by spring 102 which functions to provide a constant biasing force on the variable vane crank cylinder 38 in a clockwise direction.

In the operation of the actuation system 10 of the subject invention, during the initial operation of the gas turbine engine, the bleed control valve is fully open and the guide vanes are at a specified attitude, according to the operational characteristics of the engine. At such time, the actuator 20 is fully extended such that the piston rod 22, acting through the link 30, positions the bleed valve crank cylinder 36 in its maximum clockwise position such that the crank assembly pin 42 is spaced from the projecting ear 44. Accordingly, the crank arm 50 is rotated to its maximum clockwise position, such that the second actuating linkage 28 is positioned whereby the crank arm 76 lies along the axis A-A, and the bleed control valve is in the fully open position (not shown).

Actuator 20 is operatively associated with the control mechanism (not shown) extending to the fuel control of the gas turbine engine 12, and as the gas turbine engine is accelerated, the piston rod 22 of the actuator is withdrawn, thereby resulting in counterclockwise rotation of the bleed valve crank cylinder 36, and the simultaneous counterclockwise rotation of crank arm 50. As the latter rotates in a counterclockwise direction, it displaces the second actuating linkage 28 thereby resulting in rotation of the crank arm 76 from alignment with axis A-A (see FIG. 1 wherein the bleed control valve is fully open) to alignment along axis C-C (see FIG. 3 wherein the bleed control valve is fully closed). By virtue of the springs 70 and 72, the crank arm 50, and more particularly the pin 66, is maintained in the left-hand end of the slot 64 in the link 54 (as seen in FIG. 1). FIG. 1 illustrates the position of the components of the actuation system 10 after the actuator 20, and more particularly the piston rod 22, has been withdrawn a sufficient degree so as to cause approximately 30° counterclockwise rotation of the pivot pin 42, at which time the bleed control valve is fully closed. During this initial movement of the actuator 20, there is no corresponding movement of the linkage mechanism 26 extending to the variable vane mechanism 16 of the subject system.

Continued actuation of the actuator 20 results in the bleed control valve 18 being maintained in its fully closed position and actuation of the variable vane mechanism 16. More particularly, as the piston rod 22 is further retracted along the direction indicated by arrow B, the crank assembly pin 42 engages the recess 46 of the projecting ear 44, thereby causing rotation of the variable vane crank cylinder 38 in opposition to the biasing force of spring 102. At such time the variable vane crank 80 is rotated in a counterclockwise direction (see FIG. 3), and acting through the linkage designated 84 through 100, the first and second stages of the variable vanes within the compressor 14 are actuated to the attitude specified for efficient operation of the gas turbine engine 12. At the same time, the bleed valve crank cylinder 36 is rotated in a counterclockwise direction, along with the crank arm 50. Since the bleed control valve 18 has been actuated to its fully closed position against stop 104, counterclockwise rotation of the crank arm 50 results in sufficient force for overcoming the biasing force of springs 70 and 72, whereby the latter springs are extended as the pin 66 moves to the right within the slot 64, as illustrated in FIG. 3.

Accordingly, there is provided a new and improved actuating system for actuating the variable geometry and bleed valves of a gas turbine compressor wherein an actuating system is operative to convert the linear motion from a single actuator to multiplane intermittent rotational motion of the actuating assemblies extending to the variable geometry stator vanes and the bleed control valve. The single actuator is preferably disposed above the casing of the compressor, thereby minimizing the potential for damage to the actuator by ground fire when the subject system is employed in military aircraft. Still further, the subject system, by virtue of the individual components thereof, is capable of negotiating the multiplane relationships of the various components so as to result in minimum side loading on the linkage portions thereof and with minimum accumulative tolerances or adjustments. In addition, the subject actuation system is highly reliable and relatively inexpensive to manufacture.

Although the subject invention has been described with reference to a preferred embodiment thereof, it is apparent that modifications, alterations, or changes may be made therein by those skilled in the art without departing from the spirit and scope of the invention as defined by the appended claims.

What is claimed is:

1. An integrated multiplane actuator mechanism for sequentially controlling the bleed control valve and variable guide vanes of a generally horizontally extending compressor of a gas turbine engine comprising:

a first actuating linkage operatively connected to said bleed control valve, said bleed control valve being disposed adjacent the bottom portion of the compressor;

a single actuating means disposed adjacent the top portion of the compressor;

a second actuating linkage operatively connected to said variable guide vanes, said second actuating linkage being adjacent a side portion of the compressor;

intermediate crank means secured to the casing of the compressor and operatively connected to said first and second actuating linkages and to said actuating means, said intermediate crank means including a shaft secured to and extending in spaced, parallel relationship to the longitudinal axis of the compressor casing, a pair of crank cylinders rotatably mounted on said shaft, with the first of said crank cylinders being connected to said actuating means and to said first actuating linkage, said first crank cylinder being operatively connected for pivotal movement upon actuation of the single actuating means, said first crank cylinder including a connecting pin secured thereto and displaced radially outward therefrom, said pin extending generally parallel to the axis of the first crank cylinder into the vicinity of the second crank cylinder, the second of said crank cylinders including a connecting flange secured thereto and extending radially outward therefrom to intermittently engage the connecting pin;

said first crank cylinder further comprising a crank arm;

said first actuating linkage further comprising an adjustable link, one end of which includes an elongated slot therein, with said crank arm being connected to said adjustable link by a pin connection extending through and slidably mounted in said elongated slot thereby providing lost motion between said first crank cylinder and said first actuating linkage during sequential operation of the second actuating linkage, said crank arm of the first crank cylinder being connected to the first actuating linkage to transmit forces substantially within a first plane extending transverse to the axis of the gas turbine engine;

said second crank cylinder further comprising a crank arm;

said second actuating linkage being connected to the crank arm of the second crank cylinder to provide a transmission of forces substantially within a second plane extending parallel to said first plane; and said crank arms and said connecting flange being relatively positioned on the first and second crank cylinders to provide a sequential actuation of the first actuating linkage, and then the second actuating linkage during a full movement of the actuating means.

* * * * *